US006661880B1

(12) United States Patent
Poulis et al.

(10) Patent No.: US 6,661,880 B1
(45) Date of Patent: Dec. 9, 2003

(54) SYSTEM AND METHOD FOR EMBEDDING DIGITAL INFORMATION IN A DIAL TONE SIGNAL

(75) Inventors: Spiro Poulis, West Jordan, UT (US); Matt Smith, Sandy, UT (US); Ned Plasson, Park City, UT (US); Jeffrey A. Hanline, Kaysville, UT (US)

(73) Assignee: 3Com Corporation, Santa Clara, CA (US)

( * ) Notice: Subject to any disclaimer, the term of this patent is extended or adjusted under 35 U.S.C. 154(b) by 207 days.

(21) Appl. No.: 09/879,754

(22) Filed: Jun. 12, 2001

(51) Int. Cl.[7] .............................................. H04M 11/00
(52) U.S. Cl. .................................. 379/93.01; 379/93.17
(58) Field of Search .......................... 379/93.01, 93.17, 379/93.26, 93.28, 156, 157, 164, 207.04, 207.11, 372, 377

(56) References Cited

U.S. PATENT DOCUMENTS

| | | | |
|---|---|---|---|
| 4,048,443 A | 9/1977 | Crochiere et al. | 179/1 SA |
| 5,402,124 A | 3/1995 | Todd et al. | 341/131 |
| 5,632,003 A | 5/1997 | Davidson et al. | 395/2.38 |
| 5,673,363 A | 9/1997 | Jeon et al. | 395/2.79 |
| 5,680,439 A * | 10/1997 | Aguilera et al. | 379/40 |
| 5,768,527 A | 6/1998 | Zhu et al. | 395/200.61 |
| 5,909,445 A | 6/1999 | Schneider | 370/468 |
| 5,956,674 A | 9/1999 | Smyth et al. | 704/229 |
| 5,978,450 A * | 11/1999 | McAllister et al. | 379/207 |
| 6,058,362 A | 5/2000 | Malvar | 704/230 |
| 6,115,689 A | 9/2000 | Malvar | 704/503 |
| 6,317,484 B1 * | 11/2001 | McAllister | 379/207.13 |

OTHER PUBLICATIONS

Chen, "Elimination of Subband–Coding Artifacts Using the Dithering Technique", 1994, IEEE, pp 874–877.

Wannamaker, et al, "A Theory of Nonsubtractive Dither", IEEE, pp 499–516, Feb. 2000.

Hawksford, "Signal Conversion Technique in Digital Audio Applications", 5/1–13.

INFOCOM, *Simulation of FEC–Based Error Control for Packet Audio on the Internet*, M. Podolsky, C. Romer and S. McCanne, Dept. of Electrical Engineering and Computer Science, U of C, Berkeley, Mar. 1998.

*Spatially Disjoint Source Channel Coding; Taking Advantage of the Current Dial–Up Architecture For Video Over the Internet*, G. Schuster, I. Ssiddhu and M. Borella, Advanced Technologies Research Center 3COM Carrier Systems Business Unite 1800 W. Central Rd. Mt. Prospect, IL 60056 <guido–schuster, ikhlaq–sidhu, mike–borella>@3com.com.

Accepted for publication in IEEE Journal on Selected Areas in Communications, *Low–complexity Video Coding for Receiver–driven Layered Multicast*, S. McCanne, M. Vetterli and Van Jacobson.

* cited by examiner

*Primary Examiner*—Stella Woo
(74) *Attorney, Agent, or Firm*—Workman Nydegger

(57) ABSTRACT

Systems and methods for embedding, detecting and extracting access information from a dial tone of a private branch exchange system. The access information is embedded at the zero crossings of the dial tone. This has a minimal effect on the audible quality of the dial tone. A connecting device, such as a modem, receives the altered dial tone having access information. The access information is extracted by the connecting device and displayed to a user. The access information is automatically downloaded by the connecting device upon connecting to the private branch exchange without interaction from a user by having the connecting device go off hook such that the dial tone is received. The connecting device detects, extracts and displays the access information. After the access information is displayed to a user, the connecting device can await further user interaction or immediately make use of the access information.

37 Claims, 4 Drawing Sheets

SYSTEM AND METHOD FOR EMBEDDING DIGITAL INFORMATION IN A DIAL TONE SIGNAL

BACKGROUND OF THE INVENTION

1. Field of the Invention

The present invention relates to systems and methods for embedding data in electronic signals More particularly, the present invention relates to systems and methods for embedding data in a dial tone signal that is provided by a private branch exchange telephone system.

2. Present State of the Art

The telephone, in its simplest form, is a device used to carry the voice communications of one person to another person. Telephones have become an indispensable part or our lives and can be found in practically every home, in businesses, on airplanes, and on almost every street corner. The widespread use of telephones has made them easily accessible and they are in almost constant use.

The telephone was originally conceived to carry voice communications and it has served that function well. Today, any one telephone can typically be connected to any other telephone. The Public Switched Telephone Network (PSTN), which is the network connecting telephones to each other, therefore plays a primary role in our use of telephones. The PSTN provides dial tones, ringing signals, call waiting signals and other amenities for our use and enjoyment.

In order to effectively allow voice communication to occur over a telephone, a set of standards was developed which correspond to a set of states within which a telephone operates. The states correspond to actions performed by a telephone as well as to actions performed by the central office or the PSTN. States also correspond to actions occurring over the electronic signals that are received and transmitted over the PSTN.

The central office applies various AC and DC voltages to a two wire phone loop consisting of two wires known as the "tip" and "ring." The AC and DC voltages applied to the tip and ring are indicative of the various states that a telephone may occupy. When a telephone is not being used, it is in an idle state or "on hook." During the idle state, the central office applies a DC voltage to the phone loop, but very little current actually flows through the phone loop because a telephone is designed to have a certain impedance when it is on hook. The impedance has a large magnitude and effectively prevents current from flowing through the phone loop. When the telephone is taken off hook or in a dialing state, the impedance drops dramatically and a more significant current begins to flow through the phone loop. The central office senses this current flow and provides the user with a dial tone.

The dial tone indicates to a user that a number may be dialed and once a number has been dialed by a user, the ring state begins. During the ring state, the central office or PSTN applies an AC ringing signal to the tip and ring. The ring signal may occur, for example, at two second bursts over a six second interval. When a person answers a telephone that is ringing, the talking state begins and the voice or analog signals are carried on the PSTN between the persons that are connected by the PSTN.

The telephone network has grown to accommodate millions of people and in order to insure that all people receive proper service, the PSTN is subject to a number of different regulations. The regulations describe the specifications that any device connecting to the PSTN must meet, thus ensuring that the PSTN will not be adversely affected by the attachment of a connecting device. In addition to the specifications of connecting devices, the PSTN is itself subject to specific standards. Some of these specifications and standards it relate to the level of the DC and AC voltages, the frequency of the ringing signal and the frequency of the dial tone. These standards are strict and may not be altered by a user or a connecting device.

While these specifications ensure that the PSTN will function properly, many businesses and organizations are faced with the problem of providing telephone service to all the telephones existing within their enterprise. The PSTN would indicate that a phone loop must be established with each. and every telephone. For businesses and organizations having thousands of telephones, this is a significant logistical and economical problem.

The solution to this particular problem was the development of a private branch exchange (PBX) telephone system A PBX is a private telephone network that is used within a business or organization such as a large corporation or a hotel. A PBX is much less expensive than installing an external telephone line to each telephone within the organization. In addition, the people connected to a particular PBX telephone system can communicate with one another much easier because fewer numbers must be dialed in order to reach another person in the same PBX system.

PBX systems provide flexibility to an organization and may be digital or analog in nature. The PBX system allows many persons to have access to the PSTN without having to connect an external phone line to each telephone. The PBX system is, in effect, emulating the central office and as a result, the PBX system is typically required to meet the specifications that are prescribed by the central office. In other words, when a person utilizing a PBX system picks up a telephone connected to the PBX system, a dial tone similar to the dial tone of the PSTN is presented over the PBX system Modems and other connecting devices are typically designed to meet the specifications of the PSTN and in order for those devices to function within a PBX system, the PBX should provide the voltages and signals that are present on the PSTN.

The installation of a PBX system allows users of the PBX system to access the PSTN. This is important for many users and is especially important for persons that are away from their normal computer network connections. For example, users frequently need access to the Internet when they are traveling and many of those travelers stay in hotels which typically have PBX systems installed. The capability to use PBX systems is often essential to the traveling user. Laptop computers equipped with modems are often used to connect to the PSTN through a PBX system The problem the user faces at this point is knowing what numbers to dial in order to reach a remote location. For example, the user may subscribe to an Internet service provider that has a local access number for many different locations. When the user is traveling, the local access number of the city where the traveler is staying cannot be used because the traveler does not know that number. The local access number of the user's home can be used but the user will most likely incur the expense of a long distance telephone call. The user may not be aware of the area code of the telephone line being used, or what the charges are for calls made by a modem or the number to dial to reach an outside line. In many instances, this and other relevant data is not readily accessible to a user.

It would be an advance in the art to provide the user over a modem with data which is readily accessible over a PBX system or other telephone system without interfering with the standards promulgated by the PSTN.

SUMMARY OF THE INVENTION

PBX and other telephone systems are used by many different organizations and businesses to allow a large group of persons access to the PSTN. Many PBX systems, such as those found in hotels, are made available to many different persons. In today's society, PBX systems are being increasingly used for modem connections. The methods and systems of the present invention provide the user with useful access information which can be downloaded or retrieved from a premise PBX system using the modem without any additional hardware.

A PBX system is similar to the PSTN or central office in the sense that it emulates the central office. Connection devices such as modems and telephones that connect to a PBX system view the PBX system as the central office because the PBX provides the same signals to the connection devices that the central office would otherwise provide. A difference between the central office and a PBX or centrex system is that the signals provided by the central office cannot be altered or changed whereas the signals provided by the PBX system can be altered without having an adverse effect on either the central office or the connection devices connected to the PBX system In many situations, people that connect with a PBX system do not have easy access to vital information such as call billing information, the local area code, and the number of the telephone line in use. The present invention provides systems and methods for providing a user with access information, which may include information that the user may find useful. The access information is embedded, in one embodiment, in the dial tone generated and provided by the PBX system. The access information is embedded when the amplitude of the dial tone is small such that the audible quality of the dial tone is essentially unaffected. Connection devices such as moderns are able to listen to the dial tone and detect and extract the embedded access information from the dial tone.

In one embodiment, a modern is configured to go automatically go off hook when a user connects the modem to the PBX system While the modem is off hook, the dial tone containing embedded access information is received by the modem The access information is detected, extracted and displayed to the user. At this point, the modem goes on hook and waits for further user instruction. Alternatively, the modem may immediately use the information. For instance, if the telephone number of an Internet service provider is included in the access information, the modem may immediately dial that number.

Additional objects and advantages of the present invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fly apparent from the following description and appended claims, or may be learned by the practice of the invention as set forth hereinafter.

BRIEF DESCRIPTION OF THE DRAWINGS

In order that the maimer in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
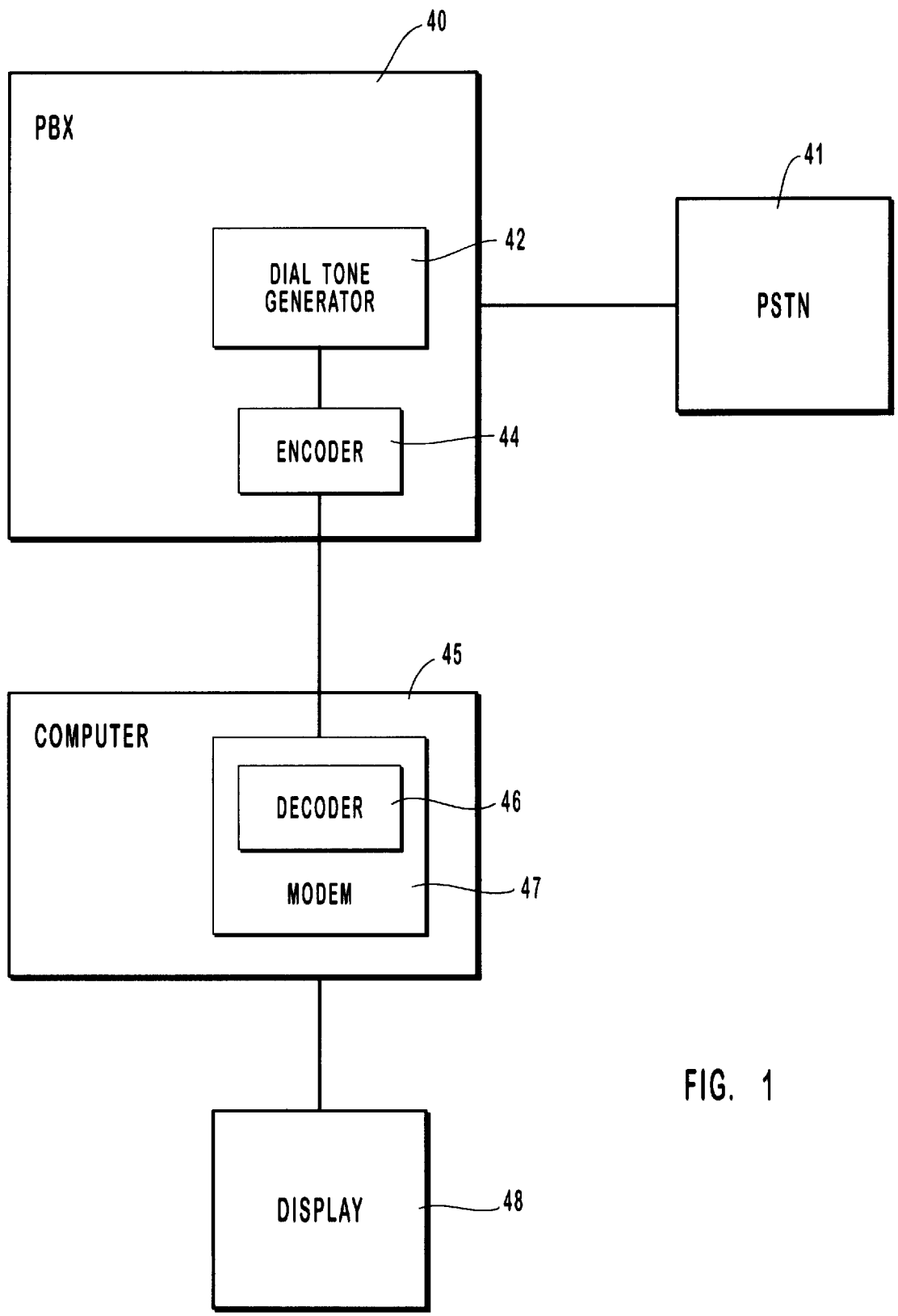
FIG. 1 is a block diagram of an exemplary system for implementing one embodiment of the present invention.

For many persons, the need to access data has become an integral part of everyday life. Businesses are increasingly using local and wide area networks and the Internet in their business operations. Individuals are connecting to the Internet in greater numbers and the resources and products provided by the Internet are in higher demand by both businesses and individuals. All of the information available on the various networks are usually accessed, however, from a single or more permanent location. For businesses, the networks and Internet are accessed from the computers located in the offices and cubicles. For individuals, the Internet is usually accessed from the individual's home. In many instances however, people are not at the office or at home. In fact, people are carrying laptop computers when they travel for both business and pleasure. One issue for persons that are away from their usual network connections is finding access to those networks as well as other information that the user considers relevant.

This problem is solved in part by using a modem with the laptop computer. The modems are capable of connecting with the telephone either directly or through any available PBX system For instance, every room in a hotel has a telephone or other jack that provides a user with access to a PBX system The laptop computer is capable of connecting with the PBX system through a modem, which in effect provides access to the PSTN. In this manner, a laptop or other device is able to access the Internet or other networks through the PBX system. A significant difficulty faced by the user of the laptop computer is knowing the number that must be dialed to provide that access.

The systems and methods of the present invention allow a PBX system to embed information, such as the local number of an Internet service provider, in the signals provided and generated by the PBX system A modem, when connected with the PBX system, automatically downloads or extracts the embedded information from the signals provided by the PBX system and displays the information, for example, on the laptop screen. If the user desires, the laptop can cause the modem to automatically use the access information that was embedded. The information embedded in the PBX system signals is not limited to telephone numbers, but can include any information that the owner of the PBX system desires to place in the signal. The methods and systems of the present invention provide for embedding, detecting, and extracting the information from the PBX system signals.

The present invention is described in terms of diagrams and flow charts. Using the diagrams and flow charts in this manner to present the invention should not be construed as limiting its scope. The embodiments of the present invention may comprise a special purpose or general purpose computer comprising various computer hardware.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EPROM, CD-ROM or other optical disk storage, magnetic disk storage or other magnetic storage devices, or any other medium which can be used to store the desired executable instructions or data structures and which can be accessed by a general purpose or special purpose computer, such as one included in a PBX system When information is transferred or provided over a network or other communications connection to a computer, the computer properly views the connection as a computer-readable medium Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Although not required, the invention can be described in the general context of computer-executable instructions, such as program modules, being executed by one or more processors. Generally, program modules include routines, programs, objects, components, data structures, etc. that perform particular tasks or implement particular abstract data types. Moreover, those skilled in the art will appreciate that the invention may be practiced with other computer system configurations, including general purpose computers, personal computers, hand-held devices, multiprocessor systems, microprocessor-based or programmable consumer electronics, network PCs, minicomputers, mainframe computers, and the like.

As used herein, access information refers to the data or information embedded in the signals provided by PBX and other telephone systems. More specifically, access information refers to the information embedded in the dial tone generated by a PBX system. Access information includes, but is not limited to, phone numbers, area codes, call billing data, menus, Internet access numbers, and the like. In fact, access information is typically chosen by the operators of the PBX system and can potentially include dates, times, advertisements and the like.

FIG. 1 is a block diagram illustrating an exemplary system for implementing the systems and methods of the present invention. In particular, FIG. 1 illustrates a system capable of embedding access information in a dial tone, detecting the access information embedded in the dial tone, and extracting and displaying the embedded access information to a user. PBX 40 is a private branch exchange telephone network used within a business or other organization and emulates PSTN 41 by providing the signals typically provided by PSTN 41 including a dial tone. Thus, the users which are connected or may connect to PBX 40 view PBX 40 as if it were PSTN 41. PBX 40 is an example of an enterprise telephone system Other enterprise telephone systems include a centrex.

A principal signal produced by PBX 40 is a dial tone, which is produced by dial tone generator 42. Typically, dial tone generator 42 generates a dial tone by summing two signals or tones which are not harmonically related. The ratio of the sum of the frequencies of the two tones over the difference of the frequencies of the two tones is usually a rational number. In one embodiment, the first tone or signal has a frequency of 350 Hz and the second tone or signal has a frequency of 440 Hz. The dial tone can thus be represented as:

$$y(t)=\cos(w_1 t)+\cos(w_2 t) \qquad (1)$$

or $$y(t)=2*\cos[(w_1-w_2)t/2]*\cos[(w_1+w_2)t/2]=2*\cos(w_m t)*\cos(w_c t). \qquad (2)$$

The dial tone y(t) is effectively an amplitude modulated suppressed carrier signal. The carrier signal has a frequency of 395 Hz ((440 Hz+350 Hz)/2) and the modulating frequency is 45 Hz ((440 Hz−350 Hz)/2).

After the dial tone is generated by dial tone generator 42, it is presented to encoder 44, which is responsible for embedding access information into the dial tone produced by dial tone generator 42. The access information is embedded at the zero crossings of the dial tone. A zero crossing occurs when the amplitude of the dial tone is zero or near zero. By embedding the access information at the zero crossings, the effect on the tone or sound of the dial tone is not appreciable to the user. One reason for embedding access information at the zero crossings is to minimize the effect that the embedded data has on the audible quality of the dial tone. A dial tone is typically pleasant to hear and data embedded at the zero crossings of the dial tone are not usually appreciable to the human ear. On the other hand, data embedded at other locations of the dial tone has a noticeable effect on the dial tone that is not pleasant to the human ear. For this and other reasons, the access information is preferably embedded at the zero crossings of the generated dial tone.

One concern about embedding access information in the dial tone is that the dial tone is effectively changed and this change is unacceptable to the central office. However, the dial tone generated by dial tone generator 42 is independent of the dial tone produced by PSTN 41. Thus, even though PBX 40 meets the standards promulgated by the central office, there is room for flexibility because PBX 40 is a separate system that only impersonates the central office with respect to an end user. Thus, a PBX system has the potential to slightly vary from the standards proposed by the central office without affecting either the user, the user's equipment, or the central office. Because the access information is embedded at the zero crossings of the dial tone, a device that does not have the capability of detecting the embedded data is not affected by the altered dial tone because the change to the dial tone, while not tolerable or acceptable to PSTN 41, is not appreciable to the telephone device connected to PBX 40.

FIG. 1 also illustrates computer 45, which is connected to PBX 40 via modem 47, which is an example of a connection device. In order to communicate through PBX 40, computer 45 comprises modem 47 and decoder 46. The dial tone encoded by encoder 44 is received by modem 47. Decoder 46 is configured to detect and extract the embedded access information from the dial tone generated by PBX 40. The decoder 46 can be embodied as hardware, software, or both. The access information extracted by decoder 46 is processed and displayed on display 48 or otherwise to a user.

Figure 2A:
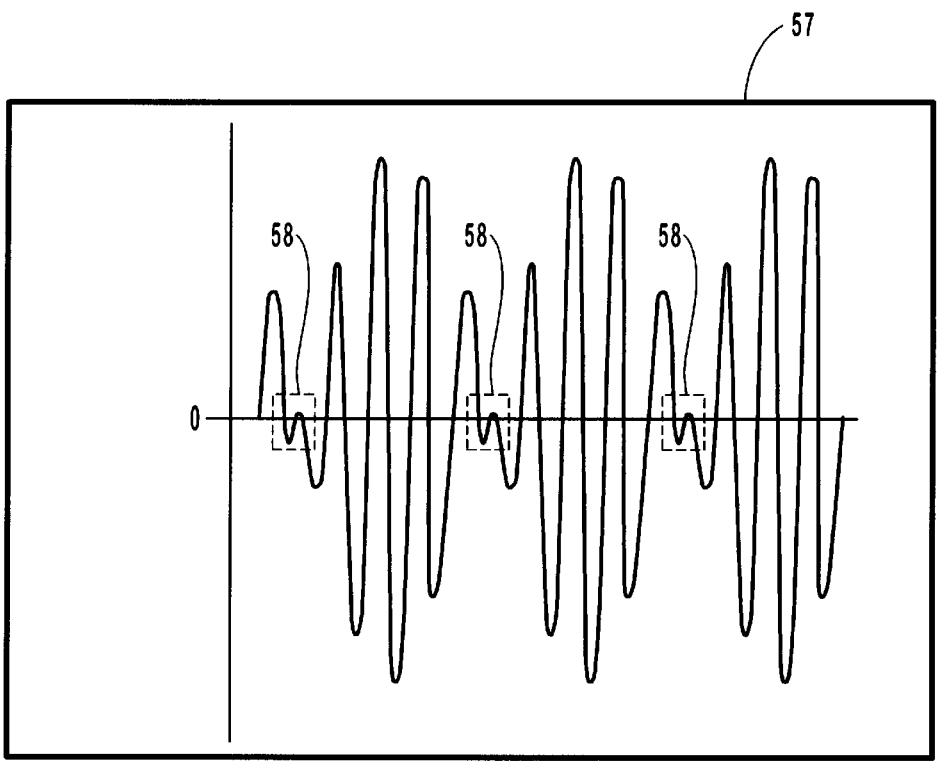
FIG. 2a is an illustration of the zero crossings representing a digital one in the waveform of a dial tone.
Figure 2B:
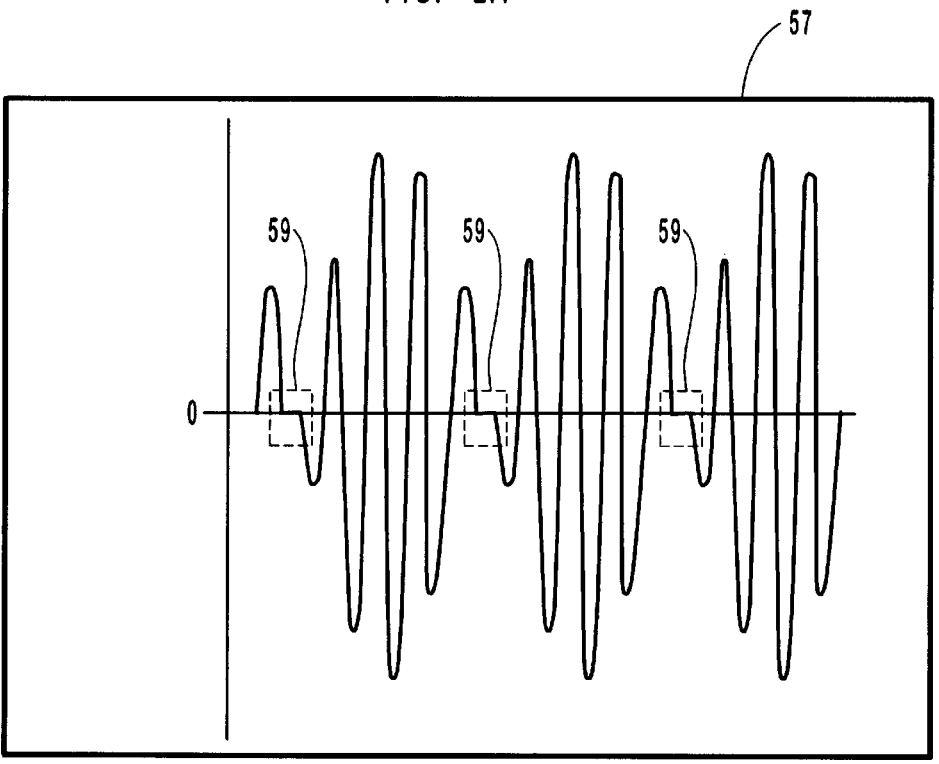
FIG. 2b is an illustration of the zero crossings representing a digital zero in the waveform of a dial tone.

FIG. 2a is a detailed block diagram of a waveform of dial tone 57 As described 18 by equation (2) above dial tone 57 is a combination of a carrier signal and a modulating signal. At each zero crossing 58, the amplitude of dial tone signal 57 is equal to or near zero. In a preferred embodiment, a digital zero is created by encoder 44 by zeroing the dial tone at the relevant zero crossing 58 and a digital one is created by not altering the dial tone waveform. Thus, each zero crossing 58 in FIG. 2a illustrates a preferred embodiment of an encoded digital one and each zero crossing 59 in FIG. 2b illustrates a preferred embodiment of an encoded digital zero. As illustrated, the amplitude of dial tone 57 is small near zero crossing 58 and 59 and any alteration of the waveform of dial tone 57 by encoder 44 has a minimal effect on the audible quality of dial tone 57. The alteration to dial tone 57 by encoder 44 is not noticeable by connection devices that do not have the ability of detecting and extracting embedded access information. While FIGS. 2a and 2b illustrate a single digital value at each zero crossing, more than one digital value can be embedded at each zero crossing.

Figure 3:
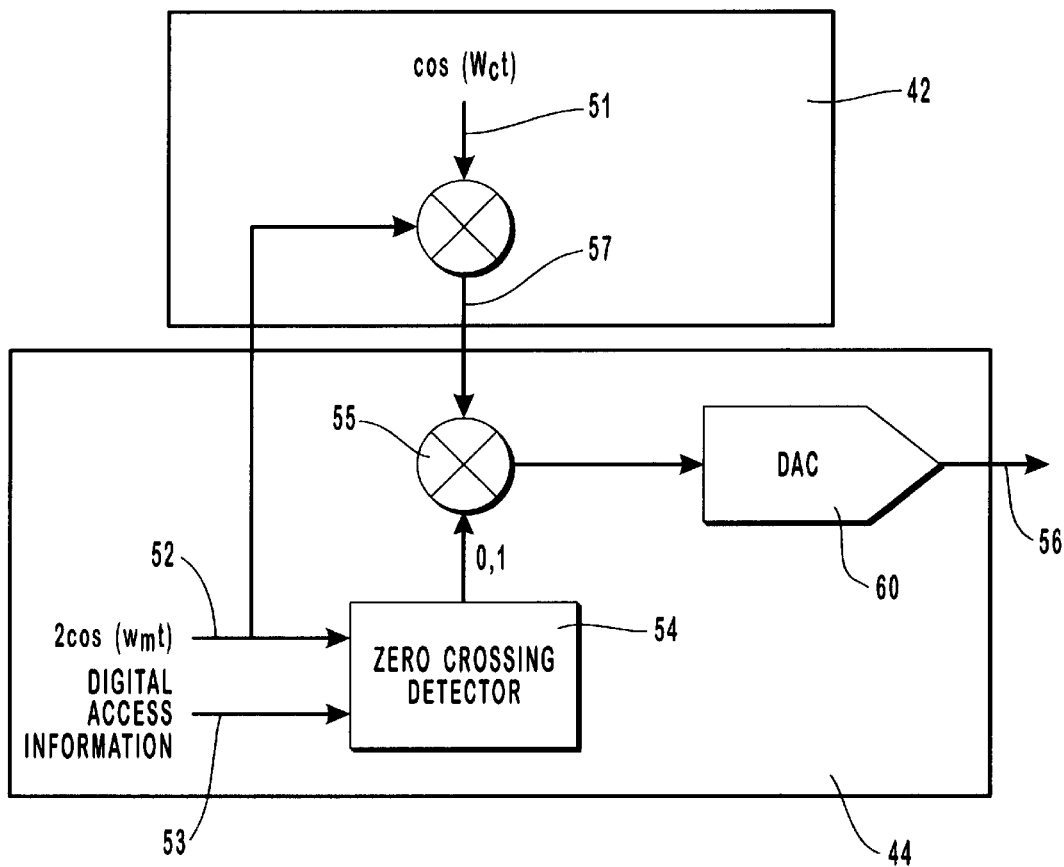
FIG. 3 is a block diagram of an exemplary system for embedding a dial tone with access information.

FIG. 3 is a more detailed block diagram illustrating a preferred embodiment of dial tone generator 42 and encoder 44. In dial tone generator 42, dial tone 57 is produced from carrier signal 51 and modulating signal 52. From equation (2) above, carrier signal 51 is cos(wct) and modulating signal 52 is 2cos(wmt). Encoder 44, which is preferably implemented in software, comprises a zero crossing detector 54 which receives modulating signal 52 from dial tone generator 42 and access information signal 53, which is a digital representation of the access information being provided to a user by a private branch exchange system The output of zero crossing detector 54 is either a one or a zero. If the output is a one, then the waveform of dial tone 57 is unchanged at the zero crossing. If the output of zero crossing detector 54 is a zero, then mixer 55 causes dial tone 57 to be zeroed Digital to analog converter (DAC) 60 converts dial tone 57 to an equivalent analog signal. In some systems, DAC 60 is not needed as the signals may already be in an analog form The output of encoder 44 is composite dial tone 56, which is a dial tone signal having embedded access information.

The access information embedded in dial tone 57 is preferably embedded at times when the amplitude of the modulated signal is near the zero crossings. The access information is preferably represented as a digital signal and those portion os the access information represented by digital ones and zeros are embedded in dial tone 57 accordingly. The modulating signal has a frequency of approximately 45 Hz in this embodiment, which implies that there are two zero crossings per cycle. One bit of access information is embedded at each zero crossing, which implies that the maximum bit rate is 90 Hz. If the carrier signal were used to convey the access information, the bit rate would be approximately 790 Hz, but the signal distortion in both amplitude and frequency would most likely be excessive. As defined previously, a preferred embodiment of a digital zero is to zero the waveform The composite dial tone waveform is zeroed for a duration of ½ of the carrier period. Because the dial tone waveform is distorted at times of very small amplitude, the audible quality of the waveform is not significantly impaired.

Figure 4:
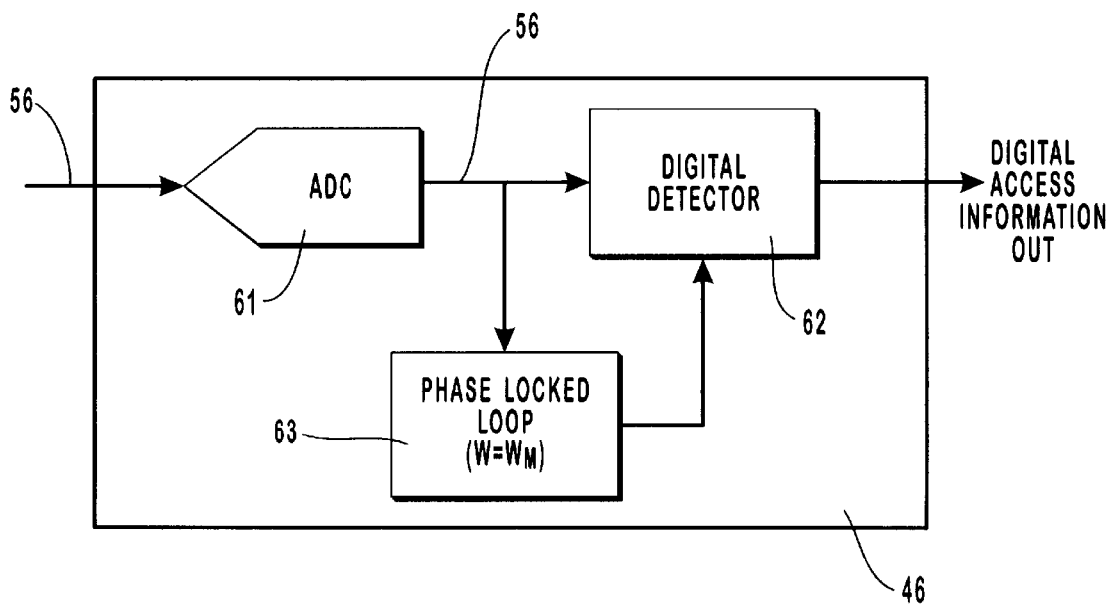
FIG. 4 is a block diagram of an exemplary system for detecting and extracting the access information from a dial tone.

FIG. 4 illustrates a more detailed block diagram of decoder 46, which is preferably implemented in software and which performs the function of extracting the embedded access a information from composite dial tone 56. Decoder 46 receives composite dial tone 56 into an analog to digital converter 61. The digital composite dial tone 56 is then sent to digital detector 62 and a phase locked loop (PLL) 63. Digital detector 62 recovers the digital access information from composite dial tone 56. In a preferred embodiment, digital detector 62 determines that composite dial tone 56 has embedded access information by detecting, in one embodiment, 6 successive zeros. If digital detector 62 does not detect the 6 successive zeros, it assumes that composite dial tone 56 does not contain embedded access information or that the PBX system is not capable of embedding access information. In either event, the normal operation of the PBX system and the modem is unaffected.

The recovery of the embedded access information by digital detector 62 is performed is by sampling composite dial tone 56 at a rate preferably greater than 10 kHz. The times at which the waveform of the composite dial done 56 should be observed are generated by a software PLL 63 which is tuned to the frequency of the modulating signal. The high to low and low to high transitions of the output waveform of PLL 63 define the digital access information sample times. The output of digital detector 62 is the access information. After the access information is extracted, it is made available to the user, in one embodiment, by displaying the access information on a display such as a computer screen.

Figure 5:
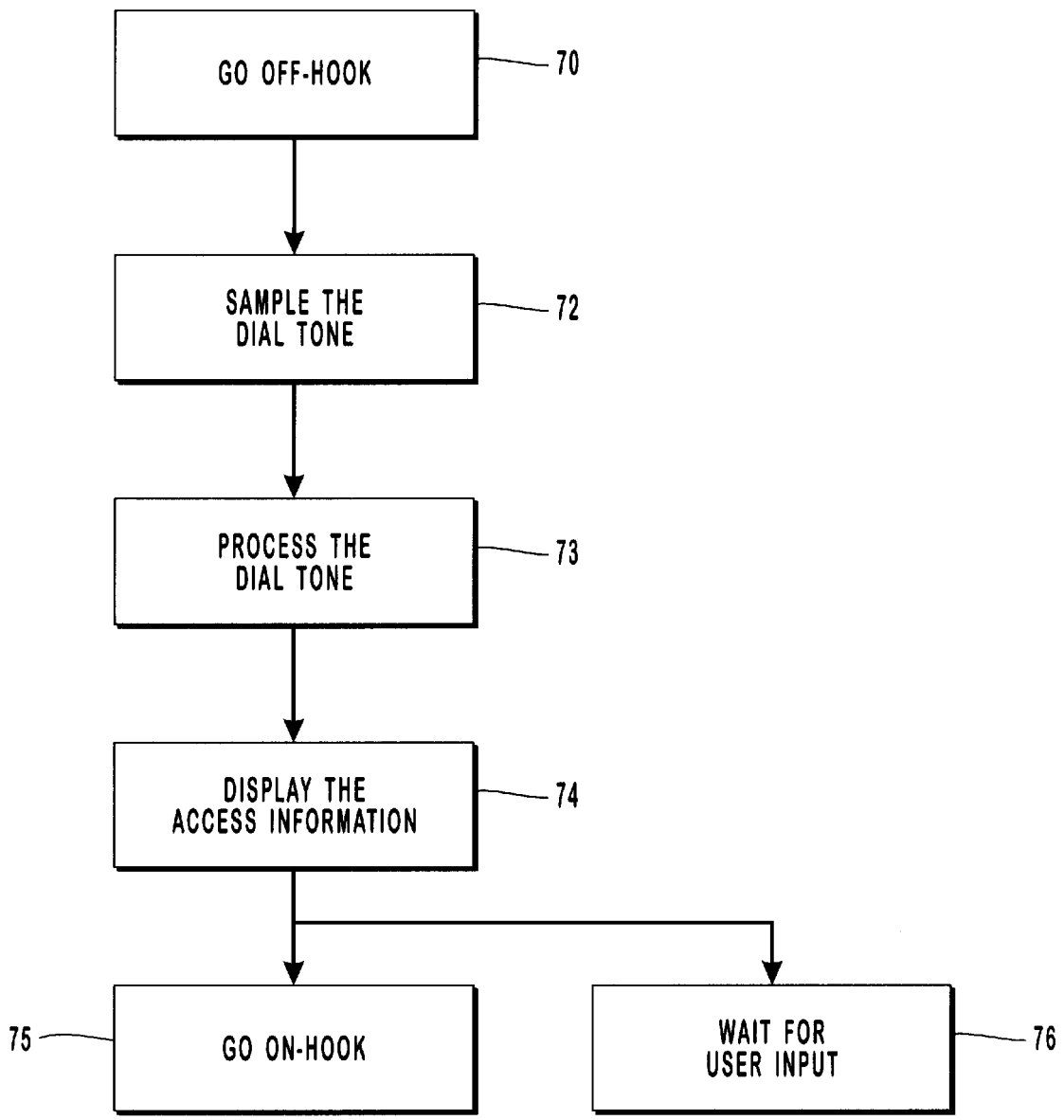
FIG. 5 is a flowchart for an exemplary method for downloading access information from a private branch exchange telephone system.

FIG. 5 is a flowchart of one embodiment for receiving access information from a PBX or other system such as a centrex. In step 70, the modem goes off hook. In most PBX systems, a dial tone is provided for a certain amount of time. If a number is not dialed, then the dial tone is no longer provided after that time period expires. Thus, the length of the dial tone is a factor that determines the amount of access information that can be provided over the dial tone. If a dial tone lasts approximately 4.5 seconds and the modulating frequency is 45 Hz , then approximately 40 to 100 bytes of data can be embedded in the dial tone signal. The amount of data embedded in a dial tone can vary depending, therefore on the length of the dial tone, the modulating frequency, and other factors.

In step 72 the dial tone carrying embedded access information is sampled at a rate preferably greater than 10 kHz. In step 73, the sampled dial tone is processed and the embedded access information is extracted. The decoder knows that a dial tone contains access information, in this example, when 6 zeros are detected in the composite dial tone. In other embodiments, a different method for recognizing that access information is present in the dial tone may be utilized. For example, detecting 5 zeros may serve to indicate that access information is embedded in the dial tone. The described method of determining that access information is embedded in a dial tone is intended to be exemplary rather than limiting.

After the access information is extracted by using a PLL to determine which waveform samples to read, the access information is organized and displayed to the user in step 74. In a preferred embodiment, the access information is displayed on a computer screen by an application which also detected and extracted the access information. Next, the user has at least two options which are described in FIG. 5. One option is to have the modem go on hook in step 75 and await further user action. Step 76 allows the application and modem to utilize the access information. For example, if the access information included the local telephone number to an Internet service provider, then the modem would automatically dial that number. In this manner, a user is able to receive access information directly from a PBX or other system over the dial tone signal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an enterprise telephone system that generates one or more signals including dial tone independently of a public telephone network, wherein the one or more signals generated by the enterprise telephone system are similar to signals generated by the public telephone network, wherein the signals generated by the public telephone network may not be altered, a method for providing access information to a user over the one or more signals, the method comprising the steps of:
   embedding the access information in a signal provided by the enterprise telephone system such that the signal is altered;
   receiving the signal at a connecting device, wherein the alteration does not affect normal operation of the connecting device;
   extracting, by the connecting device, the access information embedded in the signal; and
   displaying the access information to the user.

2. A method as defined in claim 1, wherein the signal provided by the enterprise telephone system is a dial tone.

3. A method as defined in claim 1, wherein the connecting device is a modem connected to a computer.

4. A method as defined in claim 1, wherein the step of embedding the access information further comprises the step of detecting a plurality of zero crossings of the signal.

5. A method as defined in claim 4, wherein the step of embedding the access information further comprises the steps of:
   zeroing the signal at one or more zero crossings for those portions of the access information represented by a digital zero; and
   refraining from zeroing the signal at one or more zero crossings for those portions of the access information represented by a digital one.

6. A method as defined in claim 4, wherein the step of extracting the access information further comprises the step of detecting the embedded access information.

7. A method as defined in claim 6, further comprising the step of detecting six successive digital zeros in the signal.

8. A method as defined in claim 1, wherein the step of extracting the access information further comprises the step of sampling the signal.

9. A method as defined in claim 8, wherein the signal is sampled at a frequency greater than 10 kHz.

10. A method as defined in claim 1, wherein the step of extracting the access information further comprises the step of sampling the signal at times determined by a phase locked loop having a frequency equal to a modulating frequency of the signal.

11. A computer readable medium having computer executable instructions for performing the steps recited in claim 1.

12. In a private branch exchange system which provides a dial tone that is similar to a public dial tone provided by a public telephone system, a method for providing a user with access information through the dial tone, the method comprising the steps of:
   encoding, by the private branch exchange, the access information into the dial tone such that the dial tone is altered,
   receiving the encoded dial tone at a connecting device;
   decoding the access information from the encoded dial tone by detecting the encoded access information;
   providing the decoded access information to the user.

13. A method as defined in claim 12, wherein the step of encoding the access information further comprises the step of embedding the access information at one or more zero crossings of the dial tone.

14. A method as defined in claim 12, wherein the step of encoding the access information further comprises the steps of:
   detecting the zero crossings of the dial tone;
   embedding a digital zero by zeroing the dial tone at the zero crossings; and
   embedding a digital one by refraining from zeroing the dial tone at the zero crossings.

15. A method as defined in claim 12, wherein the step of receiving the encoded dial tone further comprises the step of causing the connecting device to go off hook.

16. A method as defined in claim 12, wherein the step of decoding the encoded dial tone further comprises the steps of:
   detecting the access information; and
   extracting the access information from the encoded dial tone.

17. A method as defined in claim 16, wherein the step of detecting the access information further comprises the step of detecting six successive digital zeros.

18. A method as defined in claim 16, wherein the step of extracting the access information further comprises the steps of:
   sampling the encoded dial tone; and
   examining the sampled dial tone at a frequency controlled by a phase locked loop having a frequency substantially equal to the modulating frequency of the dial tone.

19. A method as defined in claim 12 wherein the step of providing the access information further comprises the step of displaying the access information on a computer is display.

20. A computer readable medium having computer-executable instructions for performing the steps recited in claim 12.

21. In a private branch exchange system capable of emulating a central office, a method for downloading access information from the private branch exchange system without interfering with the central office, the method comprising the steps of:
   detecting zero crossings of a signal provided by the private branch exchange;
   embedding access information at the zero crossings of the signal;
   providing the signal to a receiving device;
   sampling, by the receiving device, the signal at a frequency higher than a modulating frequency of the signal;

examining samples of the signal at times determined by a phase locked loop having a frequency approximately equal to the modulating frequency of the signal;

extracting the access information from the signal; and displaying the access information to a user.

22. A method as in claim 21, wherein a digital zero is embedded in the signal by zeroing the signal at the zero crossings of the signal and a digital one is embedded in the signal by refraining from zeroing the signal at the zero crossings of the signal.

23. A method as in claim 21, wherein the signal is a dial tone.

24. A computer readable medium having computer executable instructions for performing the steps recited in claim 21.

25. In a private branch exchange system, a method for embedding access information in a signal, the method comprising the steps of:

generating a dial tone comprising a modulating signal and a carrier signal;

detecting zero crossings of the modulating signal;

embedding access information at the zero crossings of the signal by:

zeroing the signal at zero crossings for those portions of the access information represented by digital zeros; and refraining from zeroing the signal at zero crossings for those portions of the access information represented by a digital one.

26. A method as defined in claim 25, further comprising the step of outputting the dial tone having embedded access information to a receiving device.

27. A method as defined in claim 25, wherein the frequency of the modulating signal and the frequency of the carrier frequency are defined by a central office.

28. A method as defined in claim 25, wherein the modulating frequency is 45 Hz.

29. A method as defined in claim 25, wherein the carrier frequency is 790 Hz.

30. A computer readable medium having computer executable instructions for performing the steps recited in claim 25.

31. In a system having a modem capable of connecting with a private branch exchange system, a method for downloading access information from the private branch exchange system, the method comprising the steps of:

causing a dial tone to be received by the modem from the private branch exchange system;

sampling the dial tone received by the modem at a frequency greater than a modulating frequency of the dial tone;

extracting the access information from the samples at times determined by phased locked loop having a frequency substantially equal to the modulating frequency of the dial tone; and displaying the extracted access information to a user.

32. A method as defined in claim 31, wherein the step of causing a dial tone to be received by the modem further comprises the step of connecting the modem to the private branch exchange system.

33. A method as defined in claim 31, further comprising the step of awaiting further user interaction.

34. A method as defined in claim 31, wherein the step of sampling the dial tone further comprises the step of detecting access information in the dial tone.

35. A method as defined in claim 34, wherein the step of detecting access information farther comprises the step of receiving six successive zeros embedded in the dial tone.

36. A computer readable medium having computer executable instructions for performing the steps recited in claim 31.

37. In an environment including a private branch exchange system, wherein the private branch exchange system generates one or more signals including a dial tone that are similar to public signals generated by a public telephone system wherein the public signals cannot be altered, a system for providing access information to a user over the dial tone, the system comprising:

a dial tone generator of the private branch system;

an encoder that embeds access information in the dial tone generated by the dial tone generator, wherein the encoder comprises:

a zero crossing detector that detects zero crossings of the dial tone, wherein the access information is embedded at the zero crossings of the dial tone by the encoder;

a decoder included in a receiving device, wherein the receiving device receives the dial tone and wherein the decoder extracts the access information from the dial tone, the decoder comprising:

a phase locked loop;

a digital detector, wherein the digital detector accesses the embedded access information using the phase locked loop, and a display device for displaying the access information.

\* \* \* \* \*